(12) United States Patent
Kawano et al.

(10) Patent No.: US 7,760,589 B2
(45) Date of Patent: Jul. 20, 2010

(54) INFORMATION RECORDING APPARATUS AND METHOD, AND COMPUTER PROGRAM FOR RECORDING CONTROL

(75) Inventors: Eisaku Kawano, Tokorozawa (JP); Masahiro Kato, Tokorozawa (JP); Akira Shirota, Tokorozawa (JP); Masahiro Miura, Tokorozawa (JP); Tohru Kanegae, Tokorozawa (JP); Shoji Taniguchi, Tokorozawa (JP); Eiji Muramatsu, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 302 days.

(21) Appl. No.: 11/813,888

(22) PCT Filed: Jan. 13, 2006

(86) PCT No.: PCT/JP2006/300369

§ 371 (c)(1),
(2), (4) Date: Jul. 13, 2007

(87) PCT Pub. No.: WO2006/075699

PCT Pub. Date: Jul. 20, 2006

(65) Prior Publication Data

US 2009/0003175 A1 Jan. 1, 2009

(30) Foreign Application Priority Data

Jan. 14, 2005 (JP) .............................. 2005-008473

(51) Int. Cl.
*G11B 21/08* (2006.01)
(52) U.S. Cl. ..................................................... 369/30.1
(58) Field of Classification Search ........................ None
See application file for complete search history.

(56) References Cited

U.S. PATENT DOCUMENTS

| 2002/0064124 A1* | 5/2002 | Yamamoto et al. ........ 369/275.3 |
| 2002/0080705 A1* | 6/2002 | Van Woudenberg ...... 369/59.25 |
| 2003/0185121 A1 | 10/2003 | Narumi et al. |
| 2006/0133244 A1* | 6/2006 | Tagiri et al. ................ 369/53.1 |
| 2007/0177472 A1* | 8/2007 | Miura et al. .............. 369/47.22 |

FOREIGN PATENT DOCUMENTS

| JP | 2000311346 | 11/2000 |
| JP | 2001-023237 | 1/2001 |
| JP | 2002092939 | 3/2002 |
| WO | 0223542 | 3/2002 |

* cited by examiner

*Primary Examiner*—Joseph H Feild
*Assistant Examiner*—Henok G Heyi
(74) *Attorney, Agent, or Firm*—Young & Thompson

(57) ABSTRACT

An information recording apparatus (300) is provided with: a first recording device (302 etc.) for recording the first information into a first area of the first layer; a second recording device (302 etc.) for recording the second information into a predetermined area of the second layer; and a controlling device (305) for controlling the second recording device to record the second information by the laser light, while displacing an edge indicating an innermost or outermost circumference of the predetermined area in which a penetrated area penetrated by the laser light is included in the first area, in a direction to approach an edge of the predetermined area in which the penetrated area is not included in the first area, only by a predetermined length corresponding to a tolerance of a change amount indicating a change in the reproduction quality.

3 Claims, 12 Drawing Sheets

FIG. 2
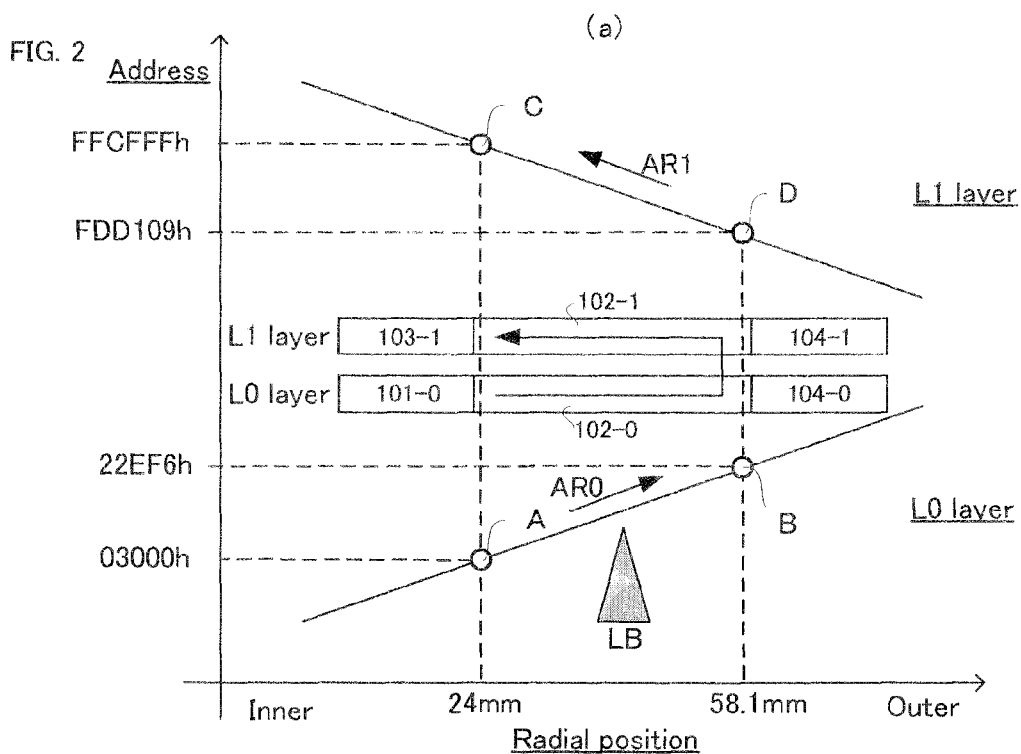
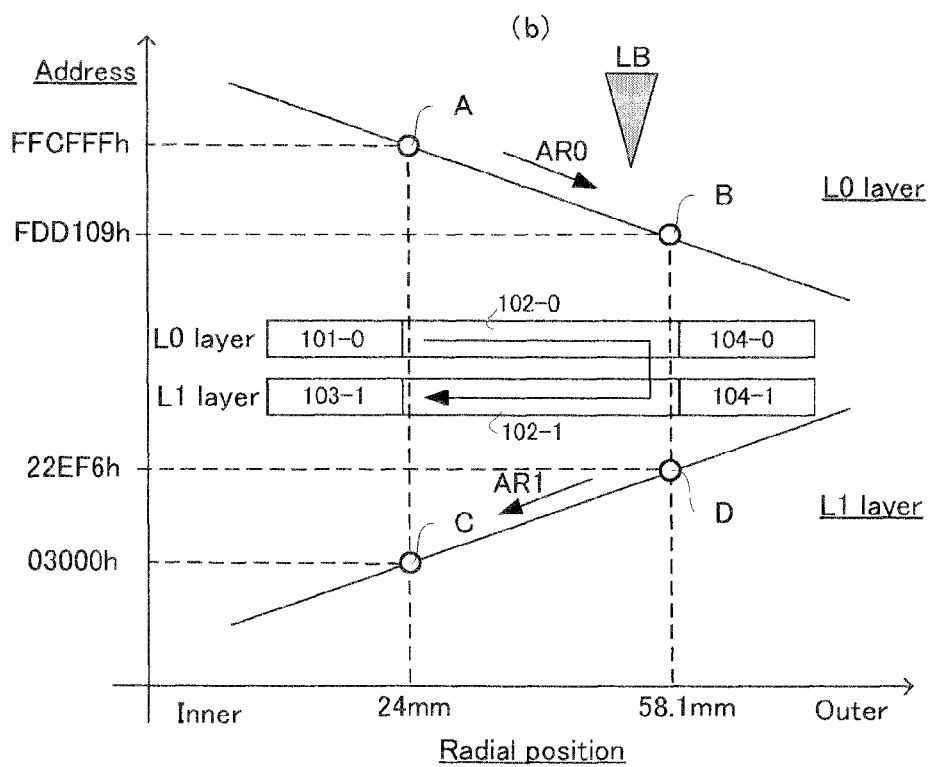

$$rb = L \times \tan(\sin^{-1}(NA/n))$$

FIG. 11
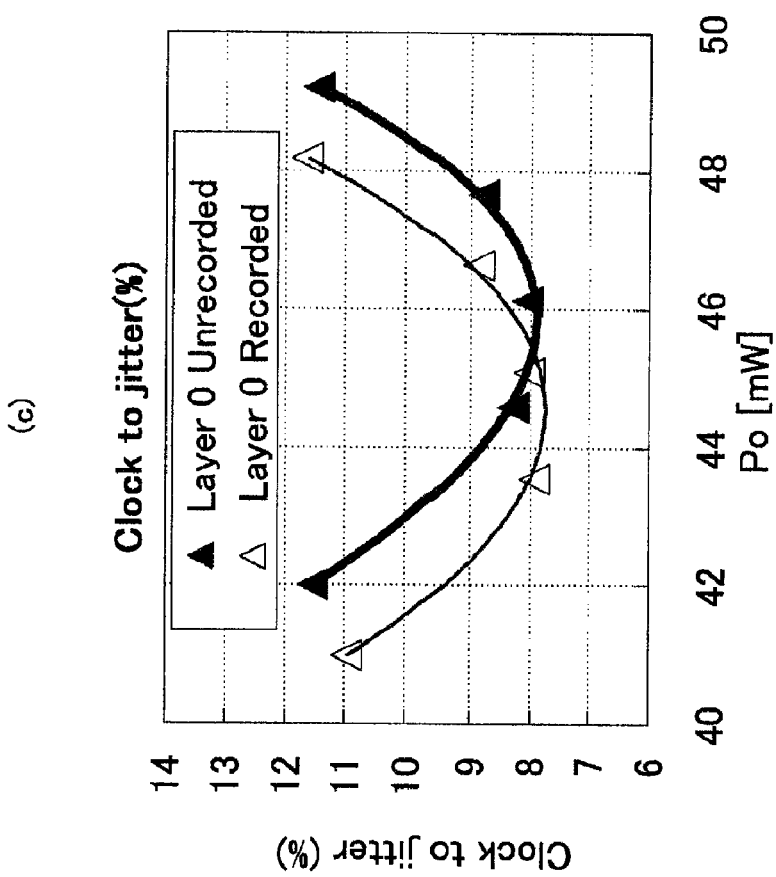
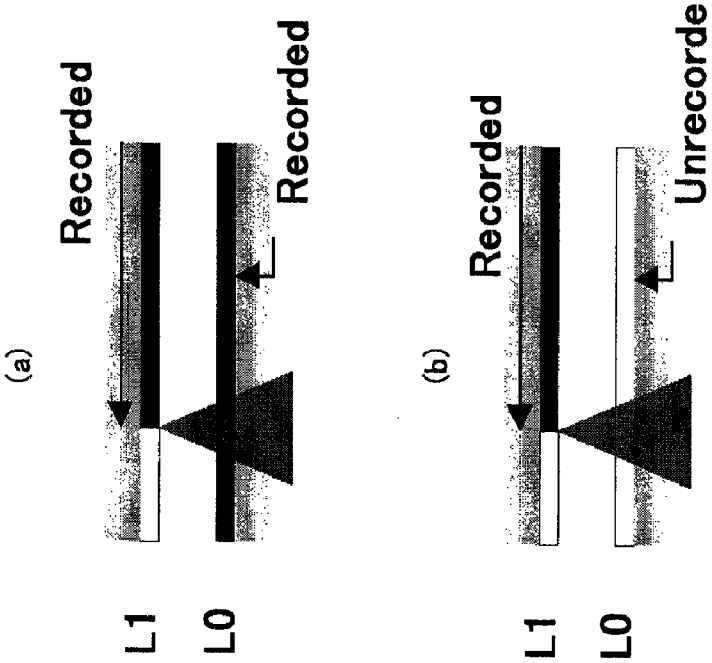

INFORMATION RECORDING APPARATUS AND METHOD, AND COMPUTER PROGRAM FOR RECORDING CONTROL

TECHNICAL FIELD

The present invention relates to an information recording apparatus and method, such as a DVD recorder, for recording information onto a multilayer type information recording medium, such as a two-layer type DVD and CD (Compact Disc), for example, and a computer program for recording control.

BACKGROUND ART

In an information recording medium, such as a CD-ROM (Compact Disc-Read Only Memory), a CD-R (Compact Disc-Recordable), a DVD-ROM, a DVD-R, a DVD-RW, and a DVD+R, for example, as described in patent documents 1 and 2 or the like, there is also developed an information recording medium, such as a multilayer type or dual layer type optical disc, in which a plurality of recording layers are laminated or pasted on the same substrate. Then, on an information recording apparatus, such as a DVD recorder, for performing the recording with respect to the dual layer type, i.e., two-layer type, optical disc, laser light for recording is focused or condensed on a recording layer located on the front (i.e. on the closer side to an optical pickup) as viewed from the irradiation side of the laser light (hereinafter referred to as an "L0 layer", as occasion demands) to thereby record information into the L0 layer in an irreversible change recording method by heat or a rewritable method. Moreover, the laser light is focused or condensed on a recording layer located on the rear of the L0 layer (i.e. on the further side from the optical pickup) as viewed from the irradiation side of the laser light (hereinafter referred to as an "L1 layer", as occasion demands), through the L0 layer or the like, to thereby record information into the L1 layer.

When information is recorded into the L1 layer, which constitutes such a two-layer type optical disc, the optimum recording power of the laser light with which the L1 layer is irradiated through the recorded L0 layer, as shown in FIG. 11(a), is 44.5 (mW: milliwatt) at which a jitter value is minimal on a parabolic curve in a thin line (with white triangles) in FIG. 11(c), for example. On the other hand, the optimum recording power of the laser light with which the L1 layer is irradiated through the unrecorded L0 layer which has a different light transmittance from that of the recorded L0 layer, as shown in FIG. 11(b), is 46 (mW: milliwatt) at which a jitter value is minimal on a parabolic curve in a thick line (with black triangles) in FIG. 11(c), for example. Thus, there is a need to consider whether or not the L0 layer is recorded, in the case of the recording in the L1 layer. With respect to this, there is devised or invented a recording method in which a so-called recording order is satisfied, which is that the laser light for recording which has penetrated or transmitted the L0 layer in a recorded state is to be irradiated, for example.

However, in producing such a two-layer type information recording medium, the L0 layer and the L1 layer are formed by different stampas, and are laminated or pasted. Thus, there is a possibility to cause an eccentricity due to an error in lamination or pasting, in the L0 layer and the L1 layer. Alternatively, since the L0 layer and the L1 layer are formed by different stampas, there likely arises deviation in a track pitch in each recording layer, or there likely arises deviation, a so-called dimensional error, in an absolute radial position with respect to a reference address in each recording layer. These cause a shift in the radial position of a recording area in the L1 layer which is associated with a recording area in the L0 layer by address information, such as a pre-format address, for example, and thus there arises a possibility that the above-mentioned recording order is not necessarily satisfied. More specifically, it is assumed that the recording is performed with a recording power which is optimized in the recording after the penetration of the recorded L0 layer. Also it is assumed that when the information is recorded into the L1 layer, as shown in a left part of FIG. 12, the recording power is set so as to perform appropriate recording in the L0 area in the recorded state. In this case, in the area where the laser light for recording which has penetrated the L0 layer in the recorded state is irradiated, the amplitude of a reproduction signal is large, and good signal quality is obtained. In other words, an asymmetry value obtained from this single is appropriate. On the other hand, as shown in a right part of FIG. 12, if the recording power is set so as to perform the appropriate recording in the L0 area in the recorded state, in the area where the laser light for recording which has penetrated the L0 layer in the unrecorded state is irradiated, the amplitude of a reproduction signal is small, and good signal quality is not obtained. In other words, the asymmetry value obtained from this signal is far from the appropriate value, like having a low asymmetry value. On the other hand, as shown in a middle part of FIG. 12, in the area where the laser light for recording which has penetrated the L0 layer in which the recorded area and the unrecorded area are mixed is irradiated, the amplitude of a reproduction signal varies depending on the extent of an eccentric amount (or radial run-out); namely, depending on how disproportionately the L0 area in the recorded state or the L0 area in the unrecorded state is located from the center of the laser light, in the circle. In other words, the asymmetry value obtained from this signal transits from one to the other out of the high level and the low level.

In order to eliminate the deviation of the optimum recording power due to the relative shift, such as the above-mentioned pasting error (or bonding error) and dimensional error, if a recording apparatus detects the recording state of the recording area in the L0 layer which is associated with the recording area in the L1 layer, a recording control process becomes complicated because it is necessary to accurately recognize the above-mentioned relative shift. On the other hand, if the information is recorded in disregard of the deviation of the optimum recording power due to the relative shift, the control becomes complicated; for example, a process parameter for obtaining a binary signal is to be dynamically changed, on a reproducing apparatus for reproducing the recorded information, which possibly causes troubles in the reproduction process.

Thus, the inventors of the present invention have proposed a method of defying in advance a relationship between an address and a physical radial position so as not to cause troubles in the reproduction quality of the recorded information even if the recording is performed with the recording power being constant in the normal case between the L0 layer and the L1 layer. Specifically, an information recording medium is prepared such that a radial position in the address system of the L1 layer corresponding to that of the L0 layer is located on the inner side than that of the L0 layer.

Moreover, the inventors of the present invention have also proposed a method of satisfying the recording order by shifting the radial position of an edge indicating the innermost or outermost circumference of a recording area formed in the L1 layer, to the outer or inner circumferential side than the radial position of an edge of a recording area formed in the L0 layer, by a margin amount determined to reduce an influence of the above-mentioned relative shift.

Patent document 1: Japanese Patent Application Laid Open NO. 2000-311346

Patent document 2: Japanese Patent Application Laid Open NO. 2001-23237

DISCLOSURE OF INVENTION

Subject to be Solved by the Invention

However, if the recording area is formed in the L1 layer by an information recording apparatus on the basis of the margin amount determined to reduce the influence of the above-mentioned relative shift, it is necessary to displace (or shift) the radial position of the innermost circumferential edge of the recording area in the L1 layer, to the outer circumferential side than the radial position of the innermost circumferential edge of the recording area in the L0 layer, by the margin amount. At the same time, it is necessary to displace (or shift) the radial position of the outermost circumferential edge of the recording area in the L1 layer, to the inner circumferential side than the radial position of the outermost circumferential edge of the recording area in the L0 layer, by the margin amount. Namely, the radial position of the recording area formed in the L1 layer satisfies the recording order more than necessary. In other words, there is such a technical problem that the recording area for satisfying the recording order is getting wasted.

It is therefore an object of the present invention to provide an information recording apparatus and method which enable more efficient information recording even on an information recording medium having a plurality of recording layers, and a computer program which makes a computer function as such an information recording apparatus.

Means for Solving the Subject (Information Recording Apparatus)

The information recording apparatus of the present invention will be explained hereinafter.

The above object of the present invention can be achieved by an information recording apparatus for recording information into at least a second recording layer (L1 layer) by laser light which has penetrated a first recording layer (L0 layer), on an information recording medium provided with at least: the first recording layer in which first information can be recorded; and the second recording layer in which second information can be recorded, the information recording apparatus provided with: a first recording device for recording the first information into a first area of the first recording layer; a second recording device for recording the second information into a predetermined area of the second recording layer, by using (i) one laser light (e.g. 44 mW) which maintains one feature in which appropriate reproduction quality (e.g. a minimum jitter value) can be obtained layer if a penetrated area penetrated by the laser light is included in the first area, or (ii) another laser light (46 mW) which maintains another feature in which appropriate reproduction (a minimum jitter value) can be obtained if the penetrated area is not included in the first area; and a controlling device for controlling the second recording device to record the second information into the predetermined area by the one or another laser light, on the basis of a change in a reproduction quality (e.g. a reduction in an asymmetry value, etc.), caused by the fact that the penetrated area and the first area have an overlap portion or an not-overlap portion.

According to the information recording apparatus of the present invention, firstly, by the first recording device, the first information is recorded into the first area of the first recording layer.

Then, under the control of the controlling device, the second recording device records the second information into the predetermined area of the second recording layer by using the one laser light which maintains an optimum recording power of the laser light if the penetrated area is included in the first area, i.e. if the second recording layer is irradiated through the recorded first area, as the one feature, in order to obtain the good reproduction quality, Alternatively, the second recording device records the second information into the predetermined area of the second recording layer by using the another laser light which maintains an optimum recording power of the laser light if the penetrated area is not included in the first area, i.e. if the second recording layer is irradiated through the unrecorded first area which has a different light transmittance from that of the recorded first recording layer, as the another feature, in order to obtain the good reproduction quality, Particularly in the present invention, under the control of the controlling device, it is possible to record the second information into the predetermined area, for example, while expanding the predetermined area, on the basis of the change in the reproduction quality, such as a reduction in an asymmetry value, caused by the fact that the penetrated area and the first area have the overlap portion or the not-overlap portion.

As a result, for example, the waste of the recording area is minimized in the predetermined area of the second recording layer, and the recording area can be used more efficiently.

In one aspect of the information recording apparatus of the present invention, the controlling device controls said second recording device to record the second information by the one laser light (e.g. 44 mW), while displacing an edge indicating an innermost or outermost circumference of the predetermined area in which the penetrated area is included in the first area, in a direction to approach an edge of the predetermined area in which the penetrated area is not included in the first area, only by a predetermined length (e.g. "d") corresponding to a tolerance of a change amount indicating a change in the reproduction quality.

According to this aspect, under the control of the controlling device, the second recording device can record the second information by the one laser light, into the predetermined area, while displacing the edge of the predetermined area of the second recording layer, in the direction to expand the predetermined area, only by the predetermined length. Here, the predetermined length of the present invention is a length in the radial direction in which the predetermined area can be expanded, determined on the basis of the tolerance of the change amount indicating the change in the reproduction quality, such as a reduction in an asymmetry value. The predetermined length can be obtained, experimentally, experientially, theoretically, or by simulations or the like.

As a result, in the case where the laser light is irradiated onto the second recording layer through the recorded first area, the waste of the recording area is minimized in the predetermined area of the second recording layer, and the recording area can be used more efficiently.

In another aspect of the information recording apparatus of the present invention, the controlling device controls said second recording device to record the second information by the another laser light (e.g. 46 mW), while displacing an edge indicating an innermost or outermost circumference of the predetermined area in which the penetrated area is not included in the first area, in a direction to approach an edge of the predetermined area in which the penetrated area is included in the first area, only by a predetermined length (d) corresponding to a tolerance of a change amount indicating a change in the reproduction quality.

According to this aspect, under the control of the controlling device, the second recording device can record the second information by the another laser light, into the predetermined area, while displacing the edge of the predetermined area of the second recording layer, in the direction to expand the predetermined area, only by the predetermined length.

As a result, in the case where the laser light is irradiated onto the second recording layer through the unrecorded first recording layer which has a different light transmittance from that of the recorded first recording layer, the waste of the recording area is minimized in the predetermined area of the second recording layer, and the recording area can be used more efficiently.

In an aspect associated with the predetermined length described above, the predetermined length can be determined on the basis of at least one of optical properties and recording properties of an individual unit of the information recording medium, variation of optical properties and recording properties in the recording area of the information recording medium, and optical properties and recording properties of the information recording medium influenced by performances of the information recording apparatus.

By virtue of such construction, it is possible to determine the predetermined length, more highly accurately and appropriately.

As a result, the predetermined area of the second recording layer can be expanded more appropriately. Thus, the waste of the recording area in the predetermined area is minimized, and the recording area can be used more efficiently.

In another aspect of the information recording apparatus of the present invention, a first track (which can display a relationship between an address and a radial position in the first recording layer) in a spiral or concentric shape is formed to record the first information in the first recording layer of the information recording medium, a second track (which can display a relationship between an address and a radial position in the second recording layer) in a spiral or concentric shape which shares the center of rotation with the first track is formed to record the second information in the second recording layer, and the controlling device also controls the second recording device to record the second information, while setting a radial position of the predetermined area with a predetermined margin included in a radial position of the first area.

According to this aspect, the first recording device records the first information along the first track in the spiral or concentric shape which can display the relationship between the address and the radial position in the first recording layer. Simultaneously or in tandem with this, under the control of the controlling device, the second recording device records the second information along the second track in the spiral or concentric shape which shares the center of rotation with the first track and which can display the relationship between the address and the radial position in the second recording layer.

Specifically, the first track may be directed from one side to the other side out of the inner and outer circumferential sides of the first or second recording layer in a disc shaped, for example, provided for the information recording medium. On the contrary, the second track may be directed from the other side to the one side. In other words, in the two-layer type or multilayer type information recording medium, continuous recording can be performed in an "opposite manner" in which tracks for recording are directed in opposite directions in two recording layers. Therefore, if the recording is continuously performed from the end edge of the first recording layer to the start edge of the second recording layer, it is hardly or not necessary to change at all the irradiation position of the laser light on the substrate surface, in the radial direction, in changing the recording layer targeted for an information recording process or reproduction process. Thus, it is possible to perform quick layer jump (i.e. layer changing operation). This is extremely useful in practice, in the point that it facilitates uninterrupted reproduction without a special buffer function to change the recording layer, in recording the continuous record information, such as a movie, for example.

Alternatively, the first track may be directed from one side to the other side out of the above-mentioned inner and outer circumferential sides, and the second track may be also directed from the one side to the other side, as in the first recording track. In other words, in the two-layer type or multilayer type information recording medium, the continuous recording can be performed in a "parallel manner" in which the recording tracks are in the same direction in the two recording layers. In the parallel manner, if the recording or reproduction is ended in the first recording layer, an optical pickup, located on the outermost circumference, needs to be displaced to the innermost circumference again when the recording or reproduction is started in the second recording layer. Thus, as compared to the opposite manner described above, it takes more time to change the first recording layer to the second recording layer, by that much.

In particular, according to this aspect, under the control of the controlling device, the second recording device records the second information, while setting the radial position of the predetermined area, with the predetermined margin included in the radial position of the first area.

As a result, in the recording operation in view of the predetermined margin to appropriately satisfy the recording order, the waste of the recording area is minimized in the predetermined area in the second recording layer, and the recording area can be used more efficiently.

In an aspect associated with the predetermined margin described above, an amount indicating an extent of the predetermined margin may be determined on the basis of at least one of (i) a dimensional error by each of the first recording layer and the second recording layer, (ii) an eccentric amount caused on the basis of a pasting error in the first recording layer and the second recording layer, and (iii) a difference in a laser irradiation radius indicating a difference between a first irradiation position and a second irradiation position, the first irradiation position indicating a radial position of the penetrated area edge which is unfocused when the laser light is irradiated, the second irradiation position indicating a radial position which is focused when the laser light is irradiated to focus on the second recording layer.

By such construction, it is possible to further reduce an influence of various relative shifts, on the basis of the predetermined margin.

As a result, it is possible to expand the predetermine area of the second recording layer more appropriately, while appropriately satisfying the recording order. Thus, the waste of the recording area in the predetermined area is minimized, and the recording area can be used more efficiently.

Moreover, in an aspect associated with the difference in the laser irradiation radius described above, at least the second recording device may include an optical pickup, and the difference in the laser irradiation radius may be determined on the basis of a numerical aperture (NA) of an objective lens provided for the optical pickup, a refractive index of a middle area which exists between the first recording layer and the second recording layer, and a distance between the first recording layer and the second recording layer.

By virtue of such construction, it is possible to further reduce the influence of various relative shifts, on the basis of the predetermined margin corresponding to the difference in the laser irradiation radius.

In another aspect of the information recording apparatus of the present invention, the reproduction quality is indicated by at least one of an asymmetry value, a jitter value, and a reproduction error rate.

According to this aspect, the predetermine area of the second recording layer can be expanded, more highly accurately and appropriately, by that the reproduction quality is indicated by the asymmetry value or the like.

As a result, the waste of the recording area in the predetermined area is minimized, and the recording area can be used more efficiently.

In another aspect of the information recording apparatus of the present invention, at least the second recording layer has a data area in which user data can be recorded, and the controlling device controls the second recording device to record the second information into the data area as the predetermined area.

According to this aspect, the waste of the recording area is minimized in the predetermined area formed in the data area in which the user data can be recorded, and the date area can be used more efficiently.

(Information Recording Method)

The information recording method of the present invention will be explained hereinafter.

The above object of the present invention can be also achieved by an information recording method in an information recording apparatus for recording information into at least a second recording layer (L1 layer) by laser light which has penetrated a first recording layer (L0 layer), on an information recording medium provided with at least: the first recording layer in which first information can be recorded; and the second recording layer in which second information can be recorded, the information recording method provided with: a first recording process of recording the first information into a first area of the first layer; a second recording process of recording the second information into a predetermined area of the second layer; and a controlling process of controlling the second recording process to record the second information by the laser light, while displacing an edge indicating an innermost or outermost circumference of the predetermined area in which a penetrated area penetrated by the laser light is included in the first area, in a direction to approach an edge of the predetermined area in which the penetrated area is not included in the first area, only by a predetermined length corresponding to a tolerance of a change amount indicating a change in the reproduction quality.

According to the information recording method of the present invention, it is possible to receive the various benefits owned by the above-mentioned information recording apparatus of the present invention.

Incidentally, in response to the various aspects of the information recording apparatus of the present invention described above, the information recording method of the present invention can adopt various aspects.

(Computer Program)

The computer program of the present invention will be discussed hereinafter.

The above object of the present invention can be also achieved by a computer program of instructions for recording control and for tangibly embodying a program of instructions executable by a computer provided in the information recording apparatus according to claim 1, to make the computer function as at least one portion of the first recording device, the second recording device, and the controlling device.

According to the computer program of the present invention, the above-mentioned information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the information recording apparatus of the present invention described above, the computer program of the present invention can adopt various aspects.

The above object of the present invention can be also achieved by a computer program product in a computer-readable medium for tangibly embodying a program of instructions executable by a computer provided in the above-mentioned information recording apparatus of the present invention (including its various aspects), to make the computer function as at least one portion of the first recording device, the second recording device, and the controlling device.

According to the computer program product of the present invention, the above-mentioned information recording apparatus can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-mentioned information recording apparatus.

These effects and other advantages of the present invention will become more apparent from the following embodiments.

As explained above, according to the information recording apparatus of the present invention, it is provided with: the first recording device; the second recording device; and the controlling device. According to the information recording method of the present invention, it is provided with: the first recording process; the second recording process; and the controlling process. Therefore, in the recording operation to appropriately satisfy the recording order, the waste of the recording area is minimized in the predetermined area of the second recording layer, and the recording area can be used more efficiently.

Moreover, according to the computer program of the present invention, it makes a computer function as the above-mentioned information recording apparatus of the present invention, so that it enables the information recording apparatus to minimize the waste of the recording area in the predetermined area of the second recording layer and to use the recording area more efficiently.

BRIEF DESCRIPTION OF DRAWINGS

FIG. 2 are a graph (FIG. 2(a)) showing one specific example of a relationship between an address and a radial position in an L0 layer and an L1 layer, which are related to the first recording layer and the second recording layer of the present invention, respectively, and a graph (FIG. 2(b)) showing another specific example.

FIG. 11 are schematic diagrams (FIG. 11(a) and FIG. 11(b)) conceptually showing the recording order of the present invention and a graph (FIG. 11(c)) numerically showing the recording order.

Figure 1:
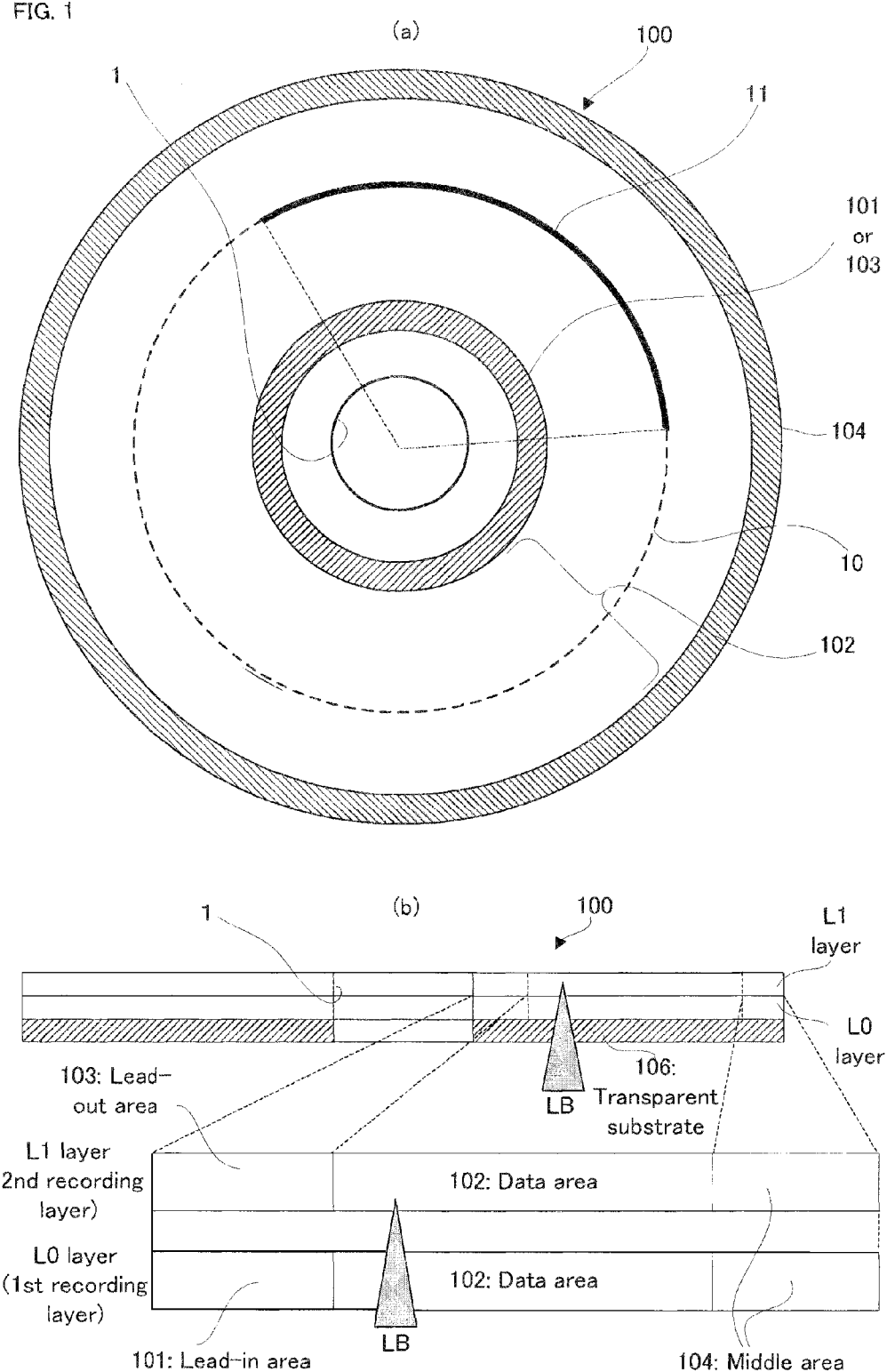
FIG. 1 are a substantial plan view (FIG. 1(a)) showing the basic structure of an optical disc having a plurality of recording areas, in an embodiment of the information recording medium of the present invention, and a schematic cross sectional view of the optical disc and a corresponding conceptual view (FIG. 1(b)) showing a recording area structure in the radial direction.

DESCRIPTION OF REFERENCE CODES 10 recording area
11 penetrated area
12 predetermined area
100 optical disc
101 lead-in area
102 data area
103 lead-out area
104 middle area
300 information recording/reproducing apparatus
302 signal recording/reproducing device
305 CPU (drive control device)
d predetermined length
W margin amount
LB laser light

BEST MODE FOR CARRYING OUT THE INVENTION

Hereinafter, the best mode for carrying out the present invention will be discussed in order for each embodiment, with reference to the drawings.

(1) Information Recording Medium

Firstly, with reference to FIG. 1 to FIG. 4, the embodiment of the information recording medium of the present invention will be discussed in detail.

Incidentally, in the optical disc in the embodiment, an opposite manner is applied, as one specific example of a recording manner, in which the track pass of the L0 layer which constitutes one example of the "first track" of the present invention and the track pass of the L1 layer which constitutes one example of the "second track" of the present invention have opposite recording directions. Moreover, it is obvious that a parallel manner may be also applied in the embodiment.

Moreover, the recording power of the laser light in the embodiment is an optimum recording power when the laser light is irradiated onto the L1 layer through the L0 layer which is already recorded. However, in the present invention, it is obvious the recording power of the laser light may be an optimum recording power when the L1 layer is irradiated through the L0 layer in the unrecorded state having a light transmission different from that of the L0 layer which is already recorded with the laser light.

(1-1) Basic Structure

Firstly, with reference to FIG. 1, the basic structure of an optical disc according to the embodiment of the recording medium of the present invention will be discussed. FIG. 1(a) is a substantial plan view showing the basic structure of an optical disc having a plurality of recording areas in the embodiments of the information recording medium of the present invention, and FIG. 1(b) is a schematic cross sectional view of the optical disc and a corresponding conceptual diagram showing a recording area structure in the radial direction.

As shown in FIG. 1(a) and FIG. 1(b), an optical disc 100 has a recording surface on a disc main body with a diameter of about 12 cm, as is a DVI). On the recording surface, the optical disc 100 is provided with: a lead-in area 101 or a lead-out area 103; a data area 102; and a middle area 104, which are associated with the embodiment, with a center hole 1 as the center. Then, for example, on a transparent substrate 106 of the optical disc 100, there are laminated recording layers, such as an L0 layer and an L1 layer. In each recording area of the recording layers, tracks 10, such as groove tracks and land tracks, are alternately placed, spirally or concentrically, with the center hole 1 as the center. On the track 10, data is divided and recorded by a unit of ECC block 11. The ECC block 11 is a data management unit by which record information is error-correctable.

Incidentally, the present invention is not particularly limited to the optical disc having these three areas. For example, even if the lead-in area 101, the lead-out area 103 or the middle area 104 does not exist, a data structure explained below can be constructed. Moreover, as described later, the lead-in area 101, the lead-out area 103 or the middle area 104 may be further segmentized.

The optical disc 100 in the embodiment, as shown in FIG. 1(*b*), has such a structure that the L0 layer and the L1 layer, which constitute one example of the "first and second record layers" of the present invention as descried later, respectively, are laminated on the transparent substrate 106. Upon the recording/reproduction of such a two-layer type optical disc 100, the recording/reproduction in the L0 layer or the L1 layer is performed, depending on which recording layer has the focus position of laser light LB, irradiated from the lower side to the upper side in FIG. 1(*b*). Moreover, the optical disc 100 in the embodiment is not limited to a two-layer single sided type, i.e., a dual layer type, but may be a two-layer double sided type, i.e., a dual layer double sided type. Furthermore, the optical disc 100 in the embodiment is not limited to the optical disc having the two recording layers, as described above, but may be an optical disc of a multilayer type which has three or more layers.

Incidentally, a recording/reproducing procedure in the opposite manner on the two-layer type optical disc and the like will be discussed later.

(1-2) Address and Radial Position

Next, with reference to FIG. 2, an address and a radial position on a two-layer type optical disc according to the embodiment of the information recording medium of the present invention will be discussed. FIG. 2 are a graph (FIG. 2(*a*)) showing one specific example of a relationship between the address and the radial position in the L0 layer and the L1 layer, which are related to the first recording layer and the second recording layer of the present invention, respectively, and a graph (FIG. 2(*b*)) showing another specific example. Incidentally, the horizontal axis in FIG. 2(*a*) and FIG. 2(*b*) indicates the position in the radial direction, and the vertical axis indicates the address.

As shown in FIG. 2(*a*) and FIG. 2(*b*), in one and another specific examples of the relationship between the address and the radial position in the L0 layer and the L1 layer, which are related to the first recording layer and the second recording layer of the present invention, respectively, the relationship between the address and the radial position is defined on the basis of the opposite manner. The opposite manner herein is, more specifically; such a manner that the optical pickup of an information recording/reproducing apparatus described later is displaced from the inner to the outer circumferential side, i.e. in the right direction of an arrow AR0 in FIG. 2(*a*) and FIG. 2(*b*), in the L0 layer as the recording or reproducing procedure of the two-layer type optical disc, while the optical pickup is displaced from the outer to the inner circumferential side, i.e. in the left direction of an arrow AR1 in FIG. 2(*a*) and FIG. 2(*b*), in the L1 layer, to thereby perform the recording or reproduction on the two-layer type optical disc. In the opposite manner, if the recording or reproduction is ended in the L0 layer, the optical pickup, located on the outermost circumference, does not need to be displaced again to the innermost circumference when the recording or reproduction is started in the L1 layer, and it is only necessary to change the focal distance from the L0 layer to the L1 layer. Thus, there is an advantage that a changing time from the L0 layer to the L1 layer is shorter than that in the parallel manner. This is why the opposite manner is broadly adopted in the recording of large volumes of content information.

(1-2-1) Increasing Address and Radial Position

In one specific example of the relationship between the address and the radial position in the L0 layer and the L1 layer, which are related to the first recording layer and the second recording layer of the present invention, respectively, the address increases in an address system based on the above-mentioned opposite manner. Incidentally, in one specific example, the laser light LB is irradiated from the lower side to the upper side, and the transit of the address in the L0 layer is illustrated in a straight line in the lower part, and the transit of the address in the L1 layer is illustrated in a straight line in the upper part.

Specifically, as shown in FIG. 2(*a*), at first, in the L0 layer, as the laser light irradiated from the optical pickup is displaced in the lead-in area 101-0, the data area 102-0, and the middle area 104-0, from the inner to the outer circumferential side, the address in the recording area of the optical disc 100 increases. More specifically, the focal point of the laser light is displaced to the outer circumferential side from the start position (an A point in FIG. 2(*a*)) of the data area 102-0 in the L0 layer with an address of "03000h" (expressed in hexadecimal notation) and at a radial position of "24 (mm)". Then, the focal point of the laser light is displaced to the end position (a B point in FIG. 2(*a*)) of the data area 102-0 in the L0 layer with an address of "22EF6h" and at a radial position of "58.1 (mm)", to thereby record or reproduce the information recorded in the data area 102-0 in the L0 layer.

On the other hand, in the L1 layer, the laser light is displaced in the middle area 104-1, the data area 102-1, and the lead-out area 103-1 from the outer to the inner circumferential side, the address in the recording area of the optical disc 100 increases. More specifically, the focal point of the laser light is displaced to the inner circumferential side from the start position (a D point in FIG. 2(*a*)) of the data area 102-1 in the L1 layer with an address of "FDD109h" and at a radial position of "58.1 (mm)". Then, the focal point of the laser light is displaced to the end position (a C point in FIG. 2(*a*)) of the data area 102-1 in the L1 layer with an address of "FFCFFFh" and at a radial position of "24 (mm)", to thereby record or reproduce the information recorded in the data area 102-1 in the L1 layer.

(1-2-2) Decreasing Address and Radial Position

In another specific example of the relationship between the address and the radial position in the L0 layer and the L1 layer, which are related to the first recording layer and the second recording layer of the present invention, respectively, the address decreases in the address system based on the above-mentioned opposite manner. Incidentally, in another specific example, the laser light LB is irradiated from the upper side to the lower side, and the transit of the address in the L0 layer is illustrated in a straight line in the upper part, and the transit of the address in the L1 layer is illustrated in a straight line in the lower part.

Specifically, as shown in FIG. 2(*b*), at first, in the L0 layer, as the laser light irradiated from the optical pickup is displaced in the lead-in area 101-0, the data area 102-0, and the middle area 104-0, from the inner to the outer circumferential side, the address in the recording area of the optical disc 100 decreases. More specifically, the focal point of the laser light is displaced to the outer circumferential side from the start position (an A point in FIG. 2(*b*)) of the data area 102-0 in the L0 layer with an address of "FFCFFFh" (expressed in hexadecimal notation) and at a radial position of "24 (mm)". Then, the focal point of the laser light is displaced to the end position (a B point in FIG. 2(*b*)) of the data area 102-0 in the L0 layer with an address of "FDD109h" and at a radial position of "58.1 (mm)", to thereby record or reproduce the information recorded in the data area 102-0 in the L0 layer.

On the other hand, in the L1 layer, the laser light is displaced in the middle area 104-1, the data area 102-1, and the lead-out area 103-1 from the outer to the inner circumferential side, the address in the recording area of the optical disc 100 decreases. More specifically, the focal point of the laser light is displaced to the inner circumferential side from the start position (a D point in FIG. 2(*a*)) of the data area 102-1 in the L1 layer with an address of "22EF6h" and at a radial position of "58.1 (mm)". Then, the focal point of the laser light is displaced to the end position (a C point in FIG. 2(*a*)) of the data area 102-1 in the L1 layer with an address of "03000h" and at a radial position of "24 (mm)", to thereby record or reproduce the information recorded in the data area 102-1 in the L1 layer.

Incidentally, the value of the address at a point at one radial position in the L0 layer, related to the first recording layer of the present invention, and the value of the address at a point at one radial position the L1 layer, related to the second recording layer of the present invention, have such a relationship that bits are inverted to each other, i.e. a complement number relationship. Moreover, in the present invention, the complement number relationship is defined by a function of "Inv(x)" which indicates a complement number, as described later. Moreover, as one specific example of the address in the L0 layer and the L1 layer, an ECC block address, which is used as a land pre pit (LPP) address, for example, is applied; however, it is obvious that a so-called sector number may be applied.

(1-3) Relative Shift

Figure 3:
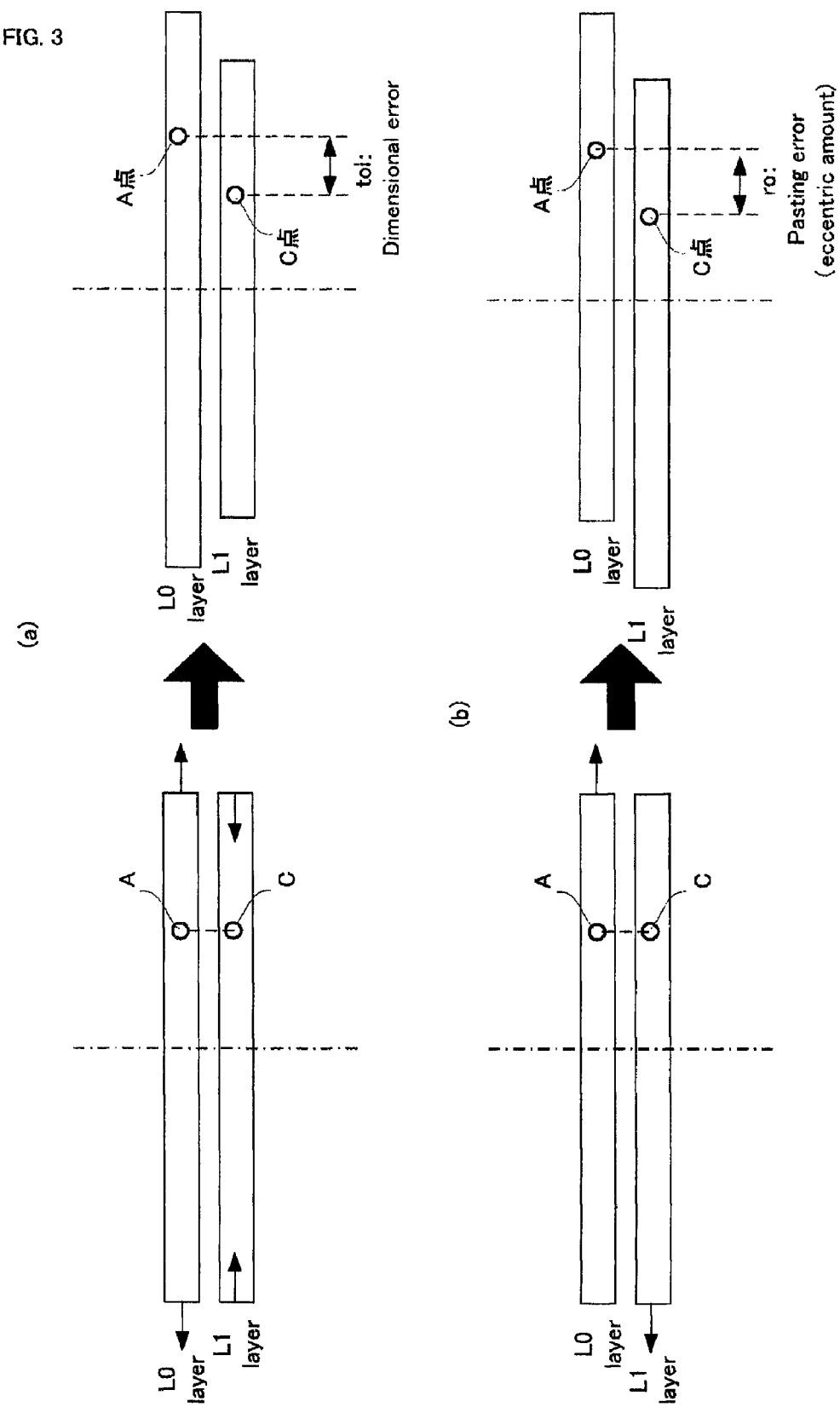
FIG. 3 are a schematic diagram (FIG. 3(a)) conceptually showing a dimensional error held by each of the L0 layer and the L1 layer, which are related to the first recording layer and the second recording layer of the present invention, and a schematic diagram (FIG. 3(b)) conceptually showing an eccentric amount (or radial run-out) caused on the basis of a pasting error in the L0 layer and the L1 layer.
Figure 4:
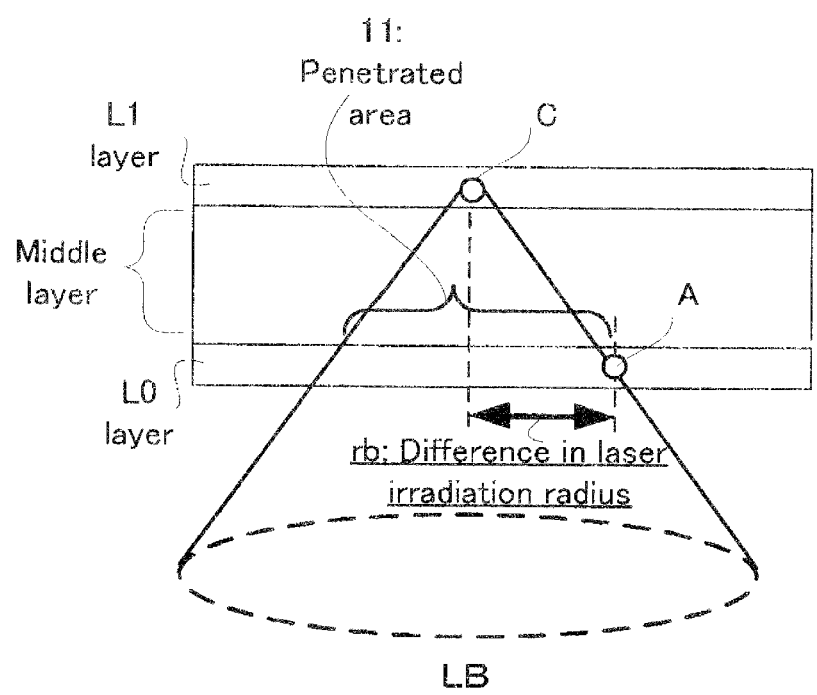
FIG. 4 is a schematic diagram conceptually showing a difference in the laser irradiation radius between an irradiation position which is irradiated with laser light in the L1 layer, which is related to the second recording layer of the present invention, and an irradiation position which is irradiated with the laser light in the L0 layer, which is related to the first recording layer of the present invention.

Next, three types of specific examples of a relative shift caused on the two-layer type optical disc provided with the L0 layer and the L1 layer, which are related to the first recording layer and the second recording layer of the present invention, respectively, will be discussed with reference to FIG. 3 and FIG. 4. FIG. 3 are a schematic diagram (FIG. 3(*a*)) conceptually showing a dimensional error held by each of the L0 layer and the L1 layer, which are related to the first recording layer and the second recording layer of the present invention, and a schematic diagram (FIG. 3(*b*)) conceptually showing an eccentric amount (or radial run-out) caused on the basis of a pasting error in the L0 layer and the L1 layer. FIG. 4 is a schematic diagram conceptually showing a difference between a laser irradiation radius in which laser light is irradiated in the L1 layer, which is related to the second recording layer of the present invention, and a laser irradiation radius in which the laser light is irradiated in the L0 layer, which is related to the first recording layer of the present invention.

At first, with reference to FIG. 3, the "dimensional error" and the "eccentric amount" of the present invention will be discussed.

(1-3-1) Dimensional Error

As shown in FIG. 3(*a*), each of the L0 layer and the L1 layer, which constitute the two-layer type optical disc, holds the dimensional error, as the relative shift. The "dimensional error" herein is an error between the address and the radial position held by each of the L0 layer and the L1 layer independently of each other, and it is an amount caused as the deviation between an absolute radial position at a reference address in the L0 layer and an absolute radial position at a reference address in the L1 layer, when the L0 layer and the L1 layer are pasted.

Specifically, the dimensional error is caused by each of the various processes which constitute a manufacturing process. In other words, the L0 layer and the L1 layer are manufactured by the injection molding of resin materials in a stampa which is prepared on the basis of an original disc produced by a cutting machine. Therefore, (i) there is a possibility that the original disc itself holds a radial error due to the error of the radial position of the cutting machine and the variations of the track pitch, or the like, in producing the original disc. (ii) There is a possibility that the individual difference of the optical disc other than the tolerance may be the radial error in thermal contraction upon the injection molding. (iii) Since the L0 layer and the L1 layer are separately prepared by different stampas, there is a possibility that the deviation of a track pitch in each recording layer may be included.

Specifically, a dimensional error tol is expressed by a difference between (i) the radial position of the start position (A point) of the data area 102-0 in the L0 layer with the address of "03000h", shown in FIG. 2(*a*) described above, and (ii) the radial position of the end position (C point) of the data area 102-1 in the L1 layer with the address of "FFCFFFh" and at the radial position of "24 mm". Then, the tolerance of the dimensional error tol is equal to or less than "20 µm" in the positive direction or in the negative direction, in the L0 layer, and it is also equal to or less than "20 µm" in the positive direction or in the negative direction, in the L1 layer. Thus, that means it is allowed to hold the tolerance by "40 µm" in total, in each individual of the two-layer type optical disc.

(1-3-2) Pasting Error (or Eccentric Amount)

As shown in FIG. 3(*b*), in the two-layer type optical disc, there is a possibility that an eccentric amount (or radial run-out) due to an error in pasting the L0 layer and the L1 layer, i.e. a so-called pasting error, is caused, as the relative shift. The "eccentric amount" herein is unrelated to the dimensional error held by each of the L0 layer and the L1 layer, and it is an amount caused as the deviation between an absolute radial position at a reference address in the L0 layer and an absolute radial position at a reference address in the L1 layer, when the L0 layer and the L1 layer are pasted.

Specifically, an eccentric amount ro is expressed by a difference between the radial position of the start position (A point) of the data area 102-0 in the L0 layer with the address of "03000h", shown in FIG. 2(*a*) described above, and the radial position of the end position (C point) of the data area 102-1 in the L1 layer with the address of "FFCFFFh" and at the radial position of "24 mm". Then, the tolerance of the eccentric amount ro is equal to or less than "20 µm" in the positive direction or in the negative direction, in the L0 layer, and it is equal to or less than "30 µm" in the positive direction or in the negative direction, in the L1 layer. That means it is allowed to hold it by "50 µm" in total, in each individual of the two-layer type optical disc.

As a result, it can be said that there is a possibility that the deviation between the absolute radial position at the reference address in the L0 layer and the absolute radial position at the reference address in the L1 layer, may take a value of "90 µm" in the positive direction or in the negative direction, on the basis of the two types of relative shifts caused on the two-layer type optical disc provided with the L0 layer and the L1 layer described above.

(1-3-3) Difference in Laser Irradiation Radius As shown in FIG. 4, the "difference in the laser irradiation radius" of the present invention will be discussed. As shown in FIG. 4, in the two-layer type optical disc, the difference in the laser irradiation radius rb may be caused by the fact that the beam shape of the laser light is a cone. The "difference in the laser irradiation radius" herein is caused as a difference between the optical spot position (C point) of the laser light which is focused on the L1 layer and the radial position (A point) of an area in which the laser light is irradiated but defocused on the L0 layer. The maximum value of the difference of the laser irradiation radius rb is expressed by the following equation (10).

$$rb = L \times \tan\{\sin^{-1}(NA/n)\} \qquad (10)$$

wherein,

L: thickness of a middle layer (a layer inserted between the L0 layer and the L1 layer)

NA: numerical aperture in optical system n: refractive index

Figure 9:
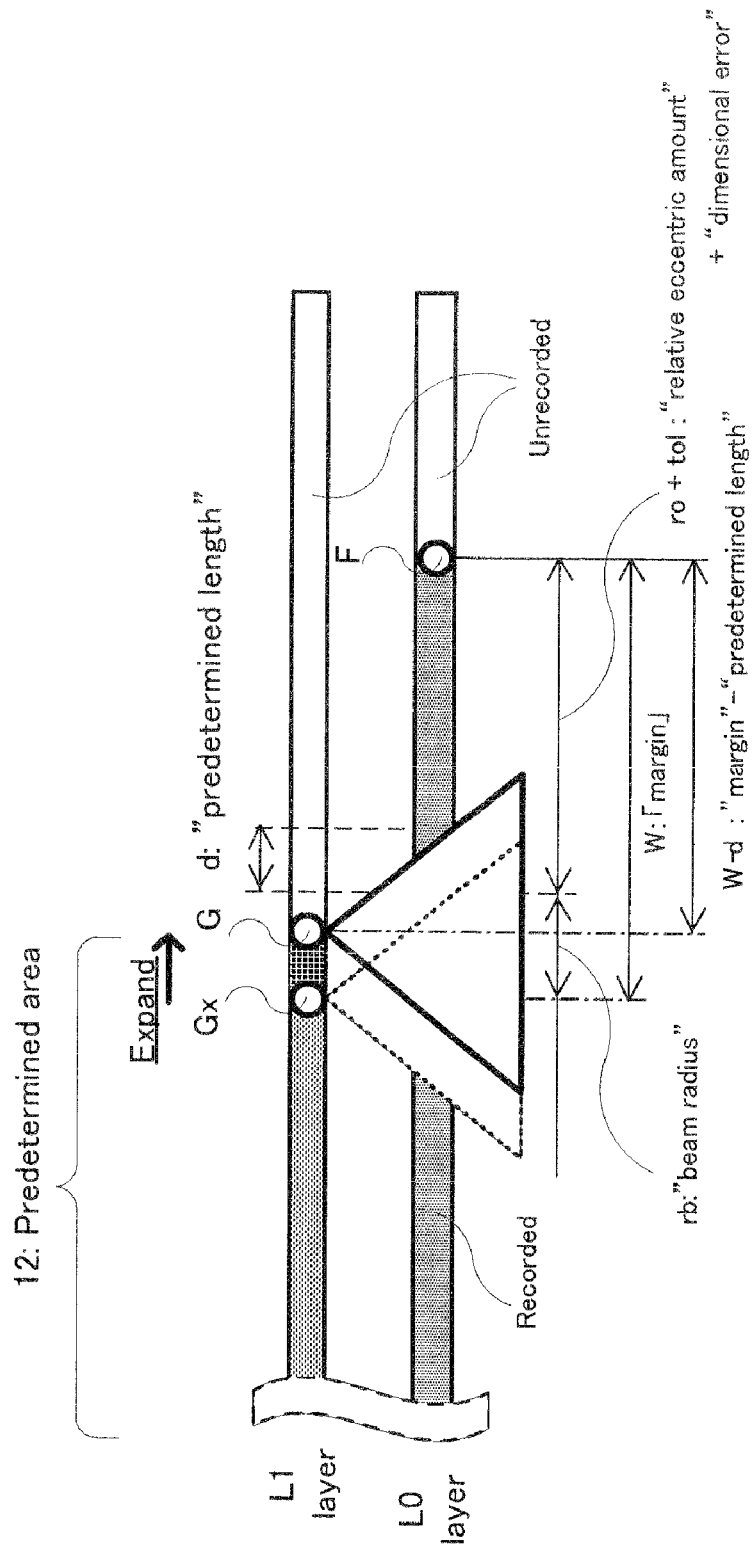
FIG. 9 is a schematic diagram schematically showing one specific example of a positional relationship among a penetrated area 11 of the L0 layer associated with the "penetrated area" of the present invention, the recording area 10 of the L0 layer associated with the "first area" of the present invention, the predetermined length "d" of the present invention, and a margin amount "W" of the present invention.

More specifically, as one specific example of the maximum value of the radius of transmitted light rb, a value of "34 μm" may be calculated on the basis of (i) the numerical aperture (NA) of the laser light, (ii) the refractive index of the middle area which exists between the L0 layer and the L1 layer, and (iii) the thickness of the middle area which determines the interlayer distance of the L0 layer and the L1 layer. More specifically, as shown in FIG. 9 described later, the margin "W" of a distance, which is to be taken between a predetermined area edge in the L1 layer and a predetermined recorded area edge in the L1 layer, for satisfying the recording order, is 124 μm, for example. On the other hand, an overlap value with an unrecorded area in the L0 layer in the present invention is a value "d" determined on the basis of the tolerance of a change amount indicating a change in the reproduction quality, such as a reduction of an asymmetry value, and it is "19 μm", for example. Therefore, a margin "W-d", which takes into account this overlap value, can be 105 μm.

As a result, the deviation between the absolute radial position at the reference address in the L0 layer and the absolute radial position at the reference address in the L1 layer, is to be set within a range of at minimum "15 μm" and at maximum "195 μm", on the outermost circumference 58.6 mm, on the basis of the three types of relative shifts caused on the two-layer type optical disc with the L0 layer and the L1 layer described above.

(2) Information Recording Apparatus of Present Invention

Next, with reference to FIG. 5 to FIG. 10, a detailed explanation will be given for the basic structure and the operation principle of the information recording apparatus of the present invention. Particularly, in the embodiment, the "information recording apparatus" of the present invention is applied to an information recording/reproducing apparatus for the optical disc.

(2-1) Basic Structure

Figure 5:
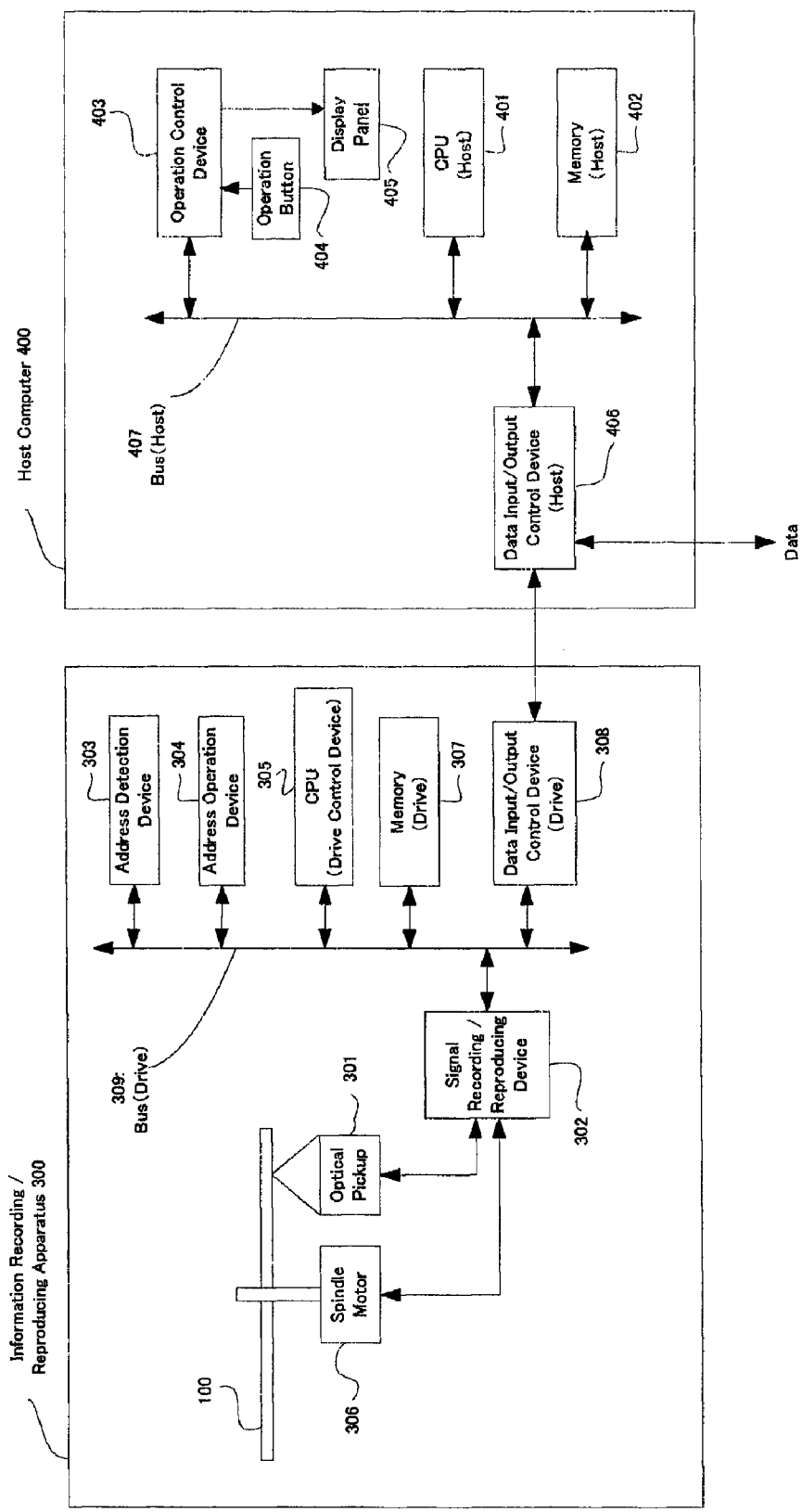
FIG. 5 is a block diagram showing the basic structures of an information recording/reproducing apparatus in an embodiment of the position verifying apparatus of the present invention, and a host computer.

Firstly, with reference to FIG. 5, the basic structure of an information recording/reproducing apparatus 300 according to the embodiment of the position verifying apparatus of the present invention, and a host computer 400 will be discussed. FIG. 5 is a block diagram showing the basic structures of the information recording/reproducing apparatus according to the embodiment of the information recording apparatus of the present invention, and the host computer. Incidentally, the information recording/reproducing apparatus 300 has a function of recording the record data onto the optical disc 100 and a function of reproducing the record data recorded on the optical disc 100.

With reference to FIG. 5, the inner structure of information recording/reproducing apparatus 300 will be discussed. The information recording/reproducing apparatus 300 is an apparatus for recording the information onto the optical disc 100 and reading the information recorded on the optical disc 100, under the control of a CPU (Central Processing Unit) 305 for the drive.

The information recording/reproducing apparatus 300 is provided with: the optical disc 100; an optical pickup 301; a signal recording/reproducing device 302; an address detection device 303; an address operation device 304; the CPU (drive control device) 305; a spindle motor 306; a memory 307; a data input/output control device 308; and a bus 309.

The host computer 400 is provided with: a CPU (host control device) 401; a memory 402; an operation control device 403; an operation button 404; a display panel 405; a data input/output control device 406; and a bus 407.

In particular, the information recording/reproducing apparatus 300 may be constructed to communicate with an external network by containing the host computer 400 having a communication device, such as a modem, in the same housing. Alternatively, the CPU (host control device) 401 of the host computer 400 having a communication device, such as an i-link, may directly control the information recording/reproducing apparatus 300 through the data input/output control device 308 and the bus 309, to thereby communicate with the external network.

The optical pickup 301 is to perform the recording/reproduction with respect to the optical disc 100, and is provided with a semiconductor laser device, a lens, and the like. More specifically, the optical pickup 301 irradiates the optical disc 100 with a light beam, such as a laser beam, as reading light with a first power upon reproduction, and as writing light with a second power upon recording, with it modulated.

The signal recording/reproducing device 302 controls the optical pickup 301 and the spindle motor 306, to thereby perform the recording/reproduction with respect to the optical disc 100. More specifically, the signal recording/reproducing device 302 is provided with: a laser diode (LD) driver; a head amplifier; and the like, for example. The laser diode driver (LD driver) drives a not-illustrated semiconductor laser device located in the optical pickup 301. The head amplifier amplifies the output signal of the optical pickup 301, i.e. the reflective light of a light beam, and outputs the amplified signal. More specifically, the signal recording/reproducing device 302 drives the not-illustrated semiconductor laser device located in the optical pickup 301, in order to determine an optimum laser power by the recording and reproduction processes for an OPC (Optimum Power Control) pattern, together with a not-illustrated timing generator or the like, under the control of the CPU 305, upon an OPC process. In particular, the signal recording/reproducing device 302 constitutes one example of the "first recording device" and the "second recording device" of the present invention, together with the optical pickup 301.

The address detection device 303 detects an address (address information) on the optical disc 100, from a reproduction signal, including a pre-format address signal or the like and outputted by the signal recording/reproducing device 302. Moreover, the address detection device 303 may be constructed to detect the offset information pre-recorded in the control data zone.

The address operation device 304 performs an operation or calculation, such as adding or subtracting the address offset value, with respect to the detected address.

The CPU (drive control device) 305 controls the entire information recording/reproducing apparatus 300 by giving an instruction to various controlling devices, through the bus 309. In particular, the CPU 305 determines the location of various recording areas, on the basis of the address operated or calculated by the address operation device 304. Then, the CPU 305 controls the signal recording/reproducing device 302 to record various record information into the determined various recording areas. Moreover, software or firmware for operating the CPU 305 is stored in the memory 307. In particular, the CPU 305 is one example of the "controlling device" of the present invention.

The spindle motor 306 is intended to rotate and stop the optical disc 100, and operates upon accessing the optical disc. More specifically, the spindle motor 306 is constructed to rotate and stop the optical disc 100 at a predetermined speed, under spindle servo from a not-illustrated servo unit or the like.

The memory 307 is used in the general data processing and the OPC process or the like on the information recording/reproducing apparatus 300, including a buffer area for the record/reproduction data, an area used as an intermediate buffer when data is converted into the data that can be used on the signal recording/reproducing device 302, and the like. Moreover, the memory 307 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like. In particular, the above-mentioned offset amount (shift amount), and the offset information about the address offset value or the like calculated on the basis of the offset amount (shift amount) may be stored (memorized) in the memory 307.

The data input/output control device 308 controls the input/output of the data from the exterior with respect to the information recording/reproducing apparatus 300, to thereby perform storage to and export from the data buffer on the memory 307. A drive control command issued from the external host computer 400 (hereinafter referred to as a "host", as occasion demands) connected to the information recording/reproducing apparatus 300 through an interface, such as a SCSI and an ATAPI, is transmitted to the CPU 305 through the data input/output control device 308. Moreover, the record/reproduction data is also transmitted and received with respect to the host computer 400 through the data input/output control device 308, in the same manner.

The CPU (host control device) 401, the memory 402, the data input/output control device 406, and the bus 407 in the host computer 400 are substantially the same as the corresponding constituent elements in the information recording/reproducing apparatus 300.

In particular, the operation control device 403 receives an operation instruction and performs display with respect to the host computer 400, and transmits an instruction by the operation button 404, such as an instruction to record or reproduce, to the CPU 401. The CPU 401 may transmit a control command to the information recording/reproducing apparatus 300, through the data input/output control device 406, on the basis of instruction information from the operation control device 403, to thereby control the entire information recording/reproducing apparatus 300. In the same manner, the CPU 401 can transmit a command for requesting the information recording/reproducing apparatus 300 to transmit an operational state to the host, with respect to the information recording/reproducing apparatus 300. By this, the operational state of the information recording/reproducing apparatus 300, such as during recording and during reproduction, can be recognized, so that the CPU 401 can output the operational state of the information recording/reproducing apparatus 300 to the display panel 405, such as a fluorescent tube and an LCD, through the operation control device 403.

One specific example used by combining the information recording/reproducing apparatus 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 402, on the CPU 401. Moreover, in another specific example, the information recording/reproducing apparatus 300 is a disc drive (hereinafter referred to as a "drive", as occasion demands), and the host computer 400 is a personal computer and a work station. The host computer, such as the personal computer, and the drive are connected through the data input/output control device 308 (406), such as the SCSI and the ATAPI, and application, such as writing software, installed in the host computer controls the disc drive.

(2-2) Operation Principle

Figure 6:
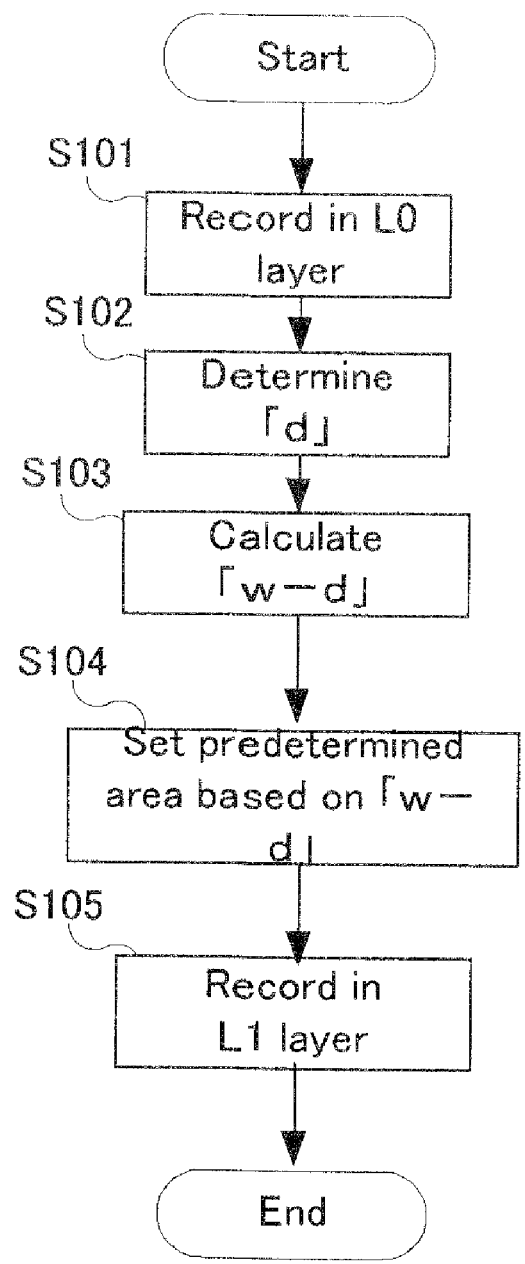
FIG. 6 is a flowchart showing a recording operation by the information recording/reproducing apparatus, according to the embodiment of the position verifying apparatus of the present invention.
Figure 7:
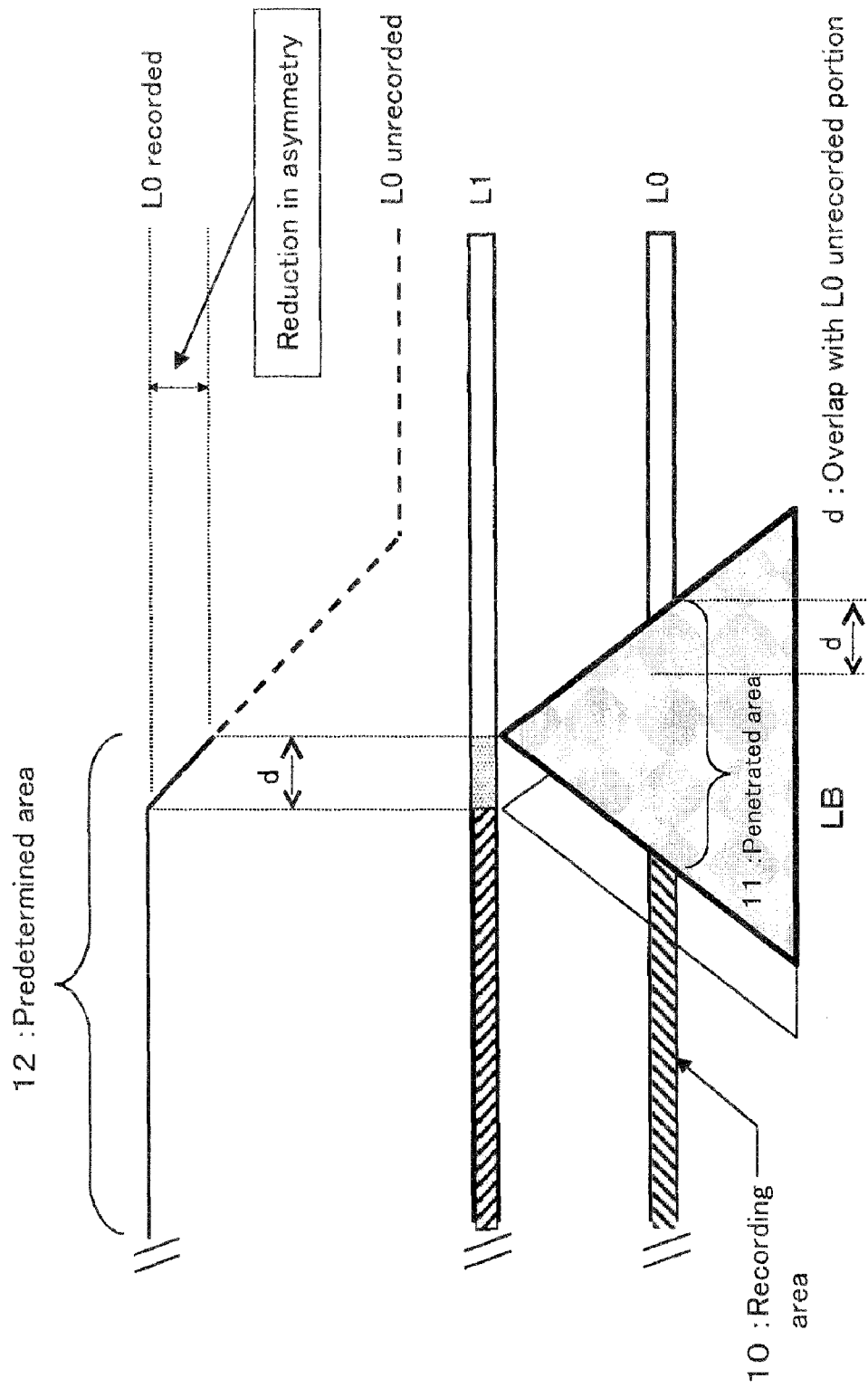
FIG. 7 is a schematic diagram schematically showing a relationship between a predetermined length "d" of the present invention and a change in reproduction quality, such as an asymmetry value, for example.

Next, with reference to FIG. 7 to FIG. 9, in addition to FIG. 6, as occasion demands, the operation principle of the information recording/reproducing apparatus according to the embodiment of the position verifying apparatus of the present invention will be discussed. FIG. 6 is a flowchart showing a recording operation by the information recording/reproducing apparatus, according to the embodiment of the position verifying apparatus of the present invention. FIG. 7 is a schematic diagram schematically showing a relationship between a predetermined length "d" of the present invention and a change in reproduction quality, such as an asymmetry value, for example.

Hereinafter, an explanation will be given in accordance with an operation procedure.

As shown in FIG. 6, firstly, under the control of the CPU 305, information is recorded into the recording area 10 of the L0 layer (step S101).

Then, under the control of the CPU 305, the predetermined length "d" is determined (step S102). Here, the predetermined length "d" according to the present invention is a length in the radial direction (i) by which a predetermined area 12 can be expanded and (ii) which is determined on the basis of the tolerance of a change amount indicating a change in the reproduction quality, such as an asymmetry value. The predetermined length "d" can be obtained, experimentally, experientially, or theoretically, or by simulations or the like. Specifically, as shown in FIG. 7, the predetermined length "d" is determined as a length corresponding to a transition (or reduction) of 2 to 3 percentages of the asymmetry value, for example. Incidentally, the predetermined length "d" may be also determined on the basis of (i) optical properties and recording properties of an individual unit of the optical disc, (ii) variation of optical properties and recording properties in the recording area of one optical disc, and (iii) optical properties and recording properties of the optical disc influenced by the information recording apparatus including the optical pickup with various performances, for example.

Now, with reference to FIG. 8, a qualitative explanation will be given for the transition of the asymmetry value of the information recorded in the L1 layer including the predetermined area 12. FIG. 8 is a schematic diagram showing (i) gradual transition from a high level to a low level in the reproduction quality of the information recorded in the "predetermined area" of the present invention, and (ii) a positional relationship between the laser light and the recording area 10 of the L0 layer associated with the "first area" of the present invention, wherein the positional relationship corresponds to the transition in the reproduction quality.

Figure 8:
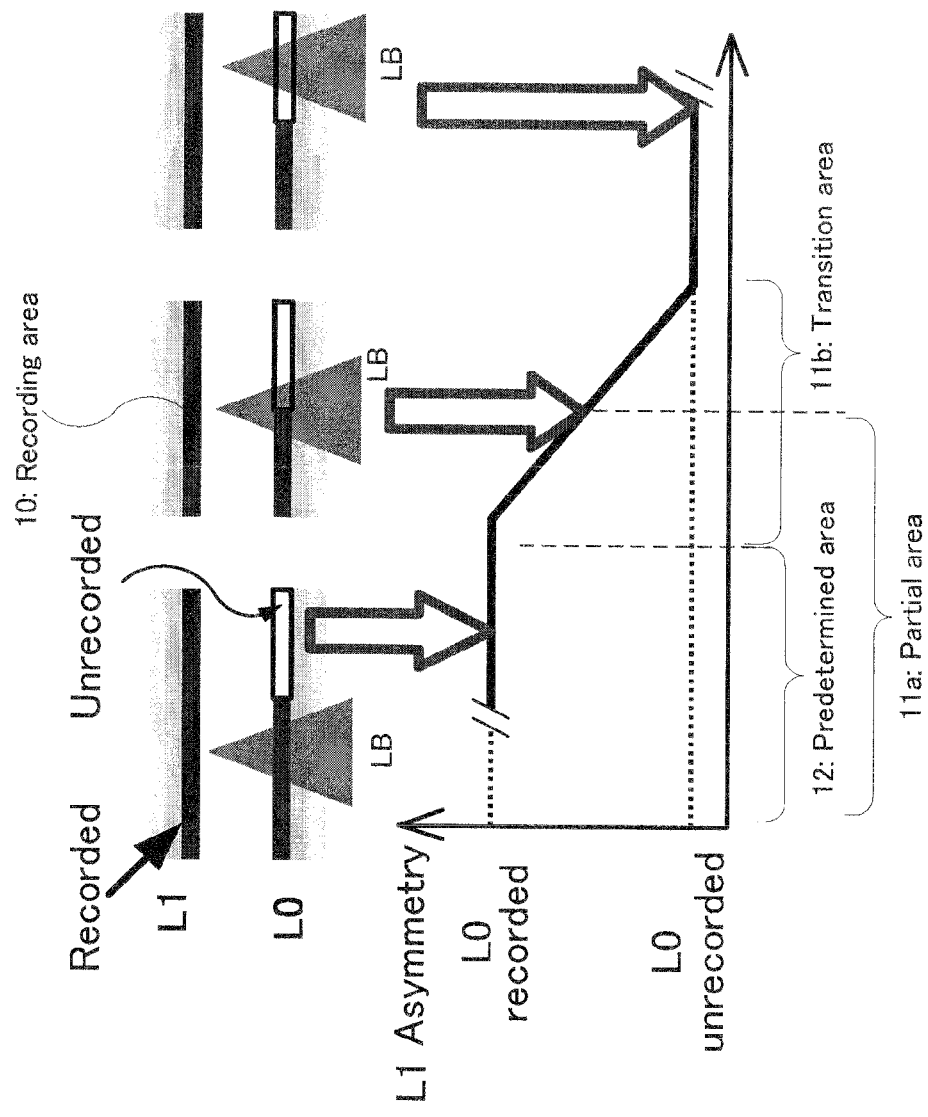
FIG. 8 is a schematic diagram showing gradual transition from a high level to a low level in the reproduction quality of the information recorded in the "predetermined area" of the present invention, and a positional relationship between the laser light and a recording area 10 of the L0 layer associated with the "first area" of the present invention, wherein the positional relationship corresponds to the transition in the reproduction quality.

As shown in FIG. 8, due to the above-mentioned difference in the laser irradiation radius, which is caused by the corn shape of the laser light LB irradiated with focusing on the L1 layer, the reproduction quality (e.g. asymmetry value) near the outer circumference edge of the predetermined area 12 in the L1 layer is gradually transited from an appropriate value (e.g. high level) to a low level. More specifically, as shown in the upper left portion of FIG. 8, near the inner side than the outer circumferential edge of the predetermined area 12, information is recorded by the laser light LB which has penetrated the recording area 10 of the L0 layer. Thus, the reproduction quality shows a high level. On the other hand, as shown in the upper central portion of FIG. 8, in a transition area 11b (i) which is on the outer circumferential side than the outer circumferential edge of the predetermined area 12 and (ii) which is on the inner circumferential side than the outer circumferential edge of a partial area 11a physically facing the recording area 10 of the L0 layer, information is recorded under the circumstances that (i) the proportion of the laser light LB which has penetrated the recording area 10 of the L0 layer and (ii) the proportion of the laser light LB which has not penetrated the recording area 10 of the L0 layer undergo a transition. Thus, the reproduction quality is gradually transited from a high level to a low level. Moreover, on the other hand, as shown in the upper right portion of FIG. 8, in an outer circumferential area than the outer circumferential edge of the partial area 11a, information is recorded by the laser light LB which has not penetrated the recording area 10 of the L0 layer. Thus, the reproduction quality shows a low level.

In the same manner, as shown in FIG. 7 described above, due to the difference of the laser irradiation radius of the laser light LB which is irradiated in the L1 layer, the reproduction quality near the outer circumferential edge of the predetermined area 12 of the L1 layer is gradually transited from a high level to a low level.

Go back to FIG. 6 again.

Then, under the control of the CPU 305, a difference "W-d" which is difference between a margin amount "W" and the predetermined length "d" is determined (step S103).

Then, on the basis of "W-d", the position of the predetermined area 12 of the L1 layer is set (step S104).

Then, in the predetermined area 12, information is recorded (step S105).

More specifically, FIG. 9 shows that the predetermined area 12 is expanded only by the predetermined length "d". FIG. 9 is a schematic diagram schematically showing one specific example of a positional relationship among (i) a penetrated area 11 of the L0 layer associated with the "penetrated area" of the present invention, (ii) the recording area 10 of the L0 layer associated with the "first area" of the present invention, (iii) the predetermined length "d" of the present invention, and (iv) a margin amount "W" of the present invention. As shown in FIG. 9, the radial position of an outermost circumferential edge "G point" of the predetermined area 12 of the L1 layer is displaced in a direction to expand the predetermined area 12 by the difference between the margin amount "W" and the predetermined length "d" from the radial position of an outermost circumferential edge "F point" of the recording area 10 of the L0 layer.

Figure 10:
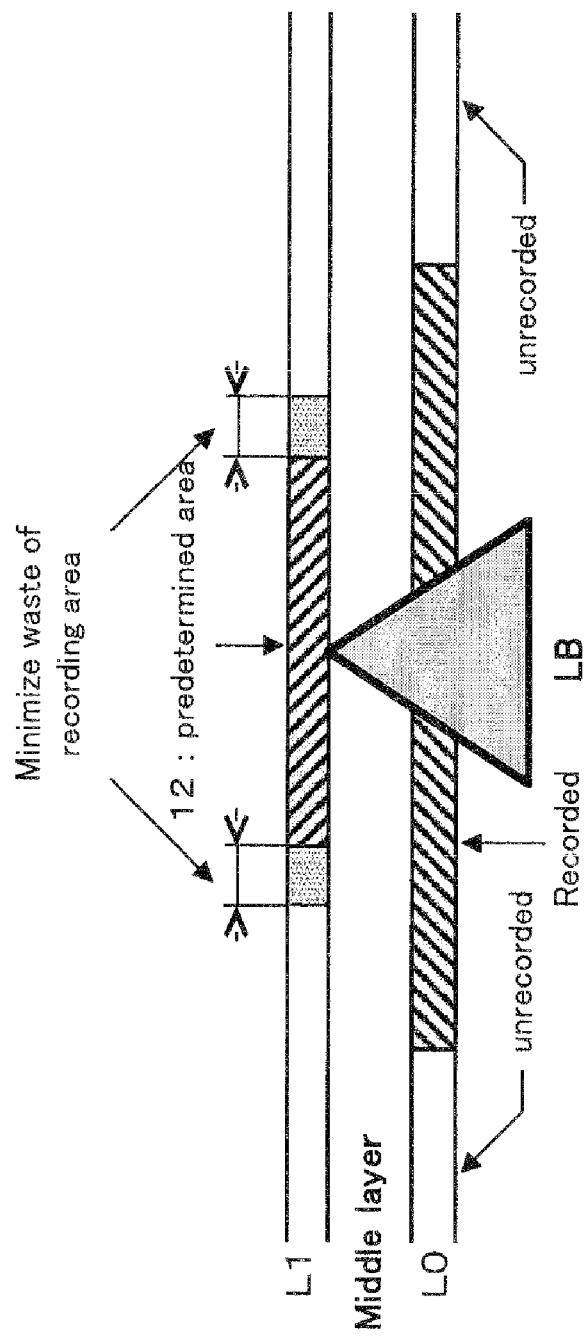
FIG. 10 is a schematic diagram schematically showing the positional relationship if predetermined areas 12a and 12b of the present invention are formed.
Figure 12:
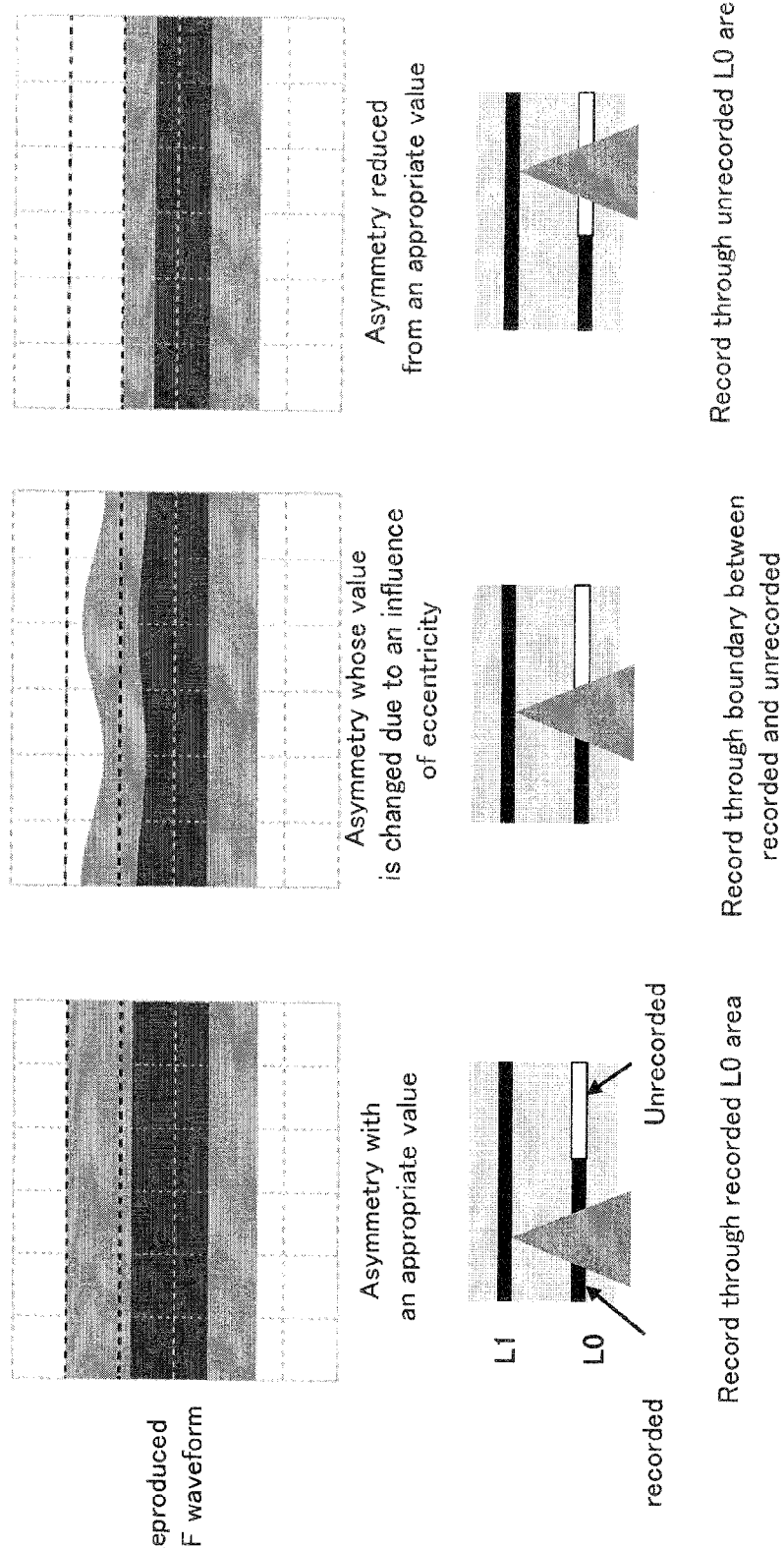
FIG. 12 is a schematic diagram showing a problem in a comparison example.

(3) Study of Operation and Effect of Information Recording Apparatus of Present Invention Next, with reference to FIG. 10, a study is made on the operation and effect of the information recording apparatus of the present invention. FIG. 10 is a schematic diagram schematically showing the positional relationship if predetermined area 12 of the present invention is formed.

According to the embodiment of the information recording apparatus of the present invention, if the predetermined area 12 is formed in the L1 layer under the control of the controlling device, it is possible to displace the edge of the predetermined area 12 of the L1 layer by the predetermined length "d" in a direction to expand the predetermined area 12, in addition to securing or maintaining the above-mentioned margin amount "W".

If the predetermined length "d" of the present invention is not considered, the predetermined area 12 is formed in the L1 layer on the basis of the margin amount "W" determined to reduce the influence of the relative shift including the above-mentioned dimensional error "tol", eccentric amount "ro", difference in the laser irradiation radius "rb", and the like. In this case, it is necessary to displace the radial position of the innermost circumferential edge of the predetermined area 12 of the L1 layer to the outer circumferential side, by the margin amount "W", from the radial position of the innermost circumferential edge of the recording area formed in the L0 layer. At the same time, it is necessary to displace the radial position of the outermost circumferential edge of the recording area of the L1 layer to the inner circumferential side, by the margin amount, from the radial position of the outermost circumferential edge of the recording area 10 formed in the L0 layer. More specifically, as shown in FIG. 9 described above, the radial position of an outermost circumferential edge "Gx point" of the predetermined area 12 of the L1 layer is displaced in a direction to make the predetermined area 12 smaller, by the margin amount "W" from the radial position of an outermost circumferential edge "T point" of the recording area 10 of the L0 layer. Namely, the radial position of the recording area formed in the L1 layer sufficiently satisfies the recording order on redundancy. In other words, the recording area for satisfying the recording order is getting wasted.

On the contrary, according to the embodiment of the information recording apparatus of the present invention, if the predetermined area 12 is formed in the L1 layer under the control of the controlling device, it is possible to displace the edge of the predetermined area 12 of the L1 layer by the predetermined length "d" in a direction to expand the predetermined area 12, in addition to securing or maintaining the above-mentioned margin amount "W". More specifically, as shown in FIG. 10 described above, the radial position of the outermost circumferential edge "G point" of the predetermined area 12 of the L1 layer is displaced in a direction to expand the predetermined area 12, by the difference "W-d" which is difference between the margin amount "W" and the predetermined length "d", from the radial position of the outermost circumferential edge "F point" of the recording area 10 of the L0 layer.

As a result, the waste of the recording area in the predetermined area 12 of the L1 layer is minimized by the recording operation for satisfying the reproduction quality, and the recording area can be used more efficiently.

In particular, this is more effective in a recording manner of performing alternate recording in each constant length, in two recording areas facing each other in the L0 layer and the L1 layer. Specifically, as shown in FIG. 10, the waste of the recording area can be minimized on the both edges of the inner and outer circumferences of the predetermined area 12. Thus, the recording area of the L1 layer can be used more efficiently.

In the above-mentioned embodiment, the information recording/reproducing apparatus for additional recording or writing once, such as a DVD-R recorder and a DVD+R recorder, is explained as one example of the information recording apparatus. The present invention, however, can be applied to an information recording/reproducing apparatus for rewriting, such as a DVD-RW recorder and a DVD+RW recorder. Moreover, it can be applied to an information recording/reproducing apparatus for large-capacity recording, which uses blue laser for recording/reproduction.

The present invention is not limited to the above-described embodiments, and various changes may be made, if desired, without departing from the essence or spirit of the invention which can be read from the claims and the entire specification. An information recording apparatus and method, and a computer program, all of which involve such changes, are also intended to be within the technical scope of the present invention.

INDUSTRIAL APPLICABILITY

The information recording apparatus and method, and the computer program for recording control according to the present invention can be applied to a multilayer optical disc, such as a DVD, and also an information recording apparatus, such as a DVD recorder. Moreover, they can be applied to an information recording apparatus or the like which is mounted on various computer equipment for consumer use or for commercial use, or which can be connected to various computer equipment.

The invention claimed is:

1. An information recording apparatus for recording information into at least a second recording layer by laser light which has penetrated a first recording layer, on an information recording medium comprising at least: the first recording layer in which first information can be recorded; and the second recording layer in which second information can be recorded, said information recording apparatus comprising:

a first recording device for recording the first information into a first area of the first recording layer;

a second recording device for recording the second information into a predetermined area of the second recording layer; and a controlling device for controlling said second recording device to record the second information by the laser light, while displacing an edge indicating an innermost or outermost circumference of the predetermined area in which a penetrated area penetrated by the laser light is included in the first area, in a direction to approach an edge of the predetermined area in which the penetrated area is not included in the first area, only by a predetermined length corresponding to a minimum value of deviation between an absolute radial position of a reference address in the first recording layer and an absolute radial position of a reference address in the second recording layer.

2. The information recording apparatus according to claim 1, wherein at least the second recording layer has a data area in which user data can be recorded, and said controlling device controls said second recording device to record the second information into the data area as the predetermined area.

3. An information recording method in an information recording apparatus for recording information into at least a second recording layer by laser light which has penetrated a first recording layer, on an information recording medium comprising at least: the first recording layer in which first information can be recorded; and the second recording layer in which second information can be recorded, said information recording method comprising:

a first recording process of recording the first information into a first area of the first recording layer;

a second recording process of recording the second information into a predetermined area of the second recording layer; and a controlling process of controlling said second recording process to record the second information by the laser light, while displacing an edge indicating an innermost or outermost circumference of the predetermined area in which a penetrated area penetrated by the laser light is included in the first area, in a direction to approach an edge of the predetermined area in which the penetrated area is not included in the first area, only by a predetermined length corresponding to a minimum value of deviation between an absolute radial position of a reference address in the first recording layer and an absolute radial position of a reference address in the second recording layer.

* * * * *